(No Model.)  5 Sheets—Sheet 3.

F. H. RICHARDS.
WEIGHING MACHINE.

No. 589,289.  Patented Aug. 31, 1897.

Witnesses:
J. L. Edwards Jr.
Fred. J. Dole.

Inventor:
F. H. Richards (No Model.)  5 Sheets—Sheet 4.

F. H. RICHARDS.
WEIGHING MACHINE.

No. 589,289.  Patented Aug. 31, 1897.

Witnesses:
C. W. Wheaton
Fred. J. Dole.

Inventor:
F. H. Richards.

(No Model.)
5 Sheets—Sheet 5.
F. H. RICHARDS.
WEIGHING MACHINE.
No. 589,289.
Patented Aug. 31, 1897.
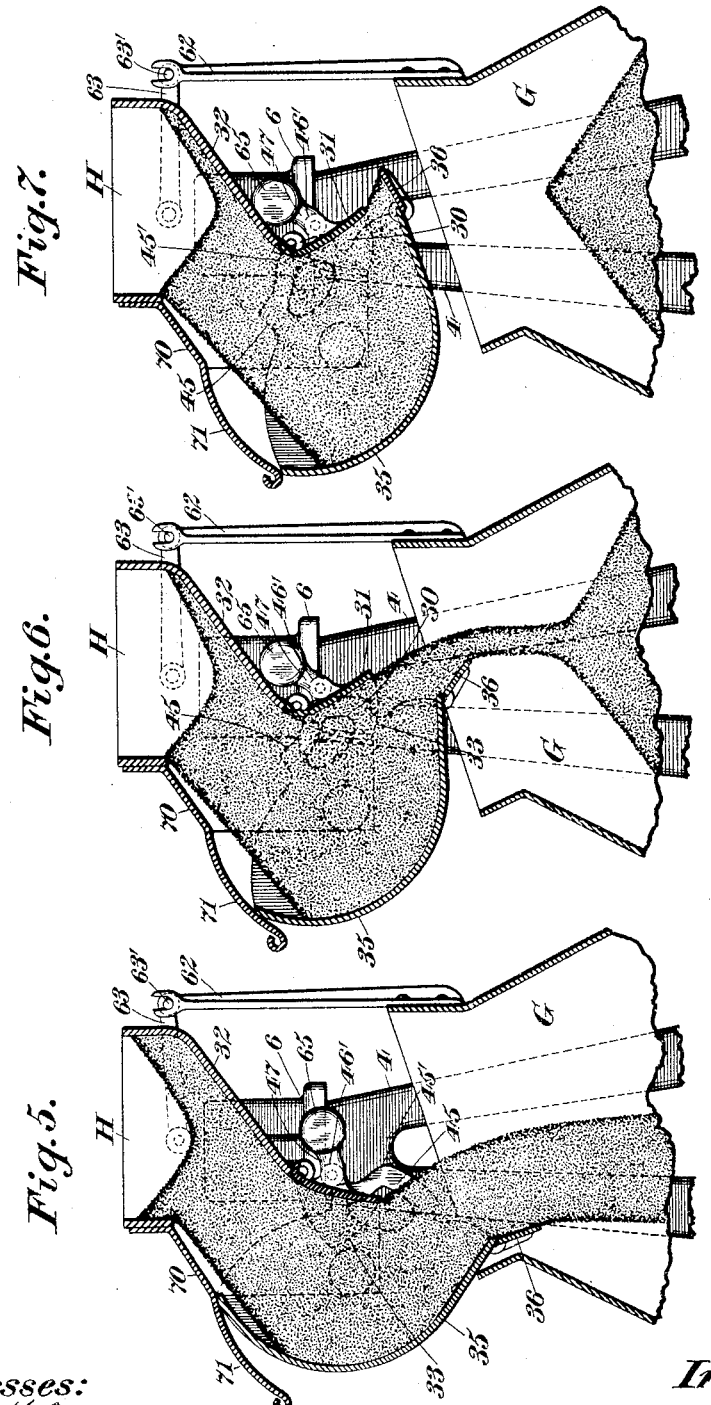
Witnesses:
E. M. Wheaton
Fred. J. Dole,
Inventor:
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 589,289, dated August 31, 1897.

Application filed March 10, 1897. Serial No. 626,759. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines for automatically weighing and delivering various kinds of granular and similar materials.

With respect to one of its features the invention comprehends the provision of stream-supplying means embodying a hopper having a drip-opening, a stream-controller for said hopper, and a drip-regulator supported on the hopper and adapted to normally cover or close the drip-opening, so that no material can flow through said opening during the major part of the loading period to affect the action of the stream-controller. At a predetermined point, or when the load is nearly completed, the drip-regulator is operated to uncover the drip-opening to permit the drip-stream to enter the load-receiver to thereby finish the partial load therein, such drip-regulator being preferably actuated by means operative with the stream-controller.

Another object of the invention is to furnish simple and compact beam mechanism comprehending a scale-beam consisting of two members connected together for simultaneous movement, the connection between the said beam members passing through the load-receiver or an elongated tube thereon, and one or both of said beam members can be counterweighted.

A further object of the invention is to provide, in connection with a load-receiver having a discharge-outlet, a closer for said outlet, which is pivoted to the load-receiver and which has flanges along its ends and front, the front flange being so situated as to form an opening between the same and the discharge edge of the closer, the closer, with said flanges, constituting a hopper which is adapted to retain a comparatively large body of material on the opening of the closer, whereby the shutting of the latter will be retarded sufficiently to permit the load-receiver to completely empty.

Figure 1:
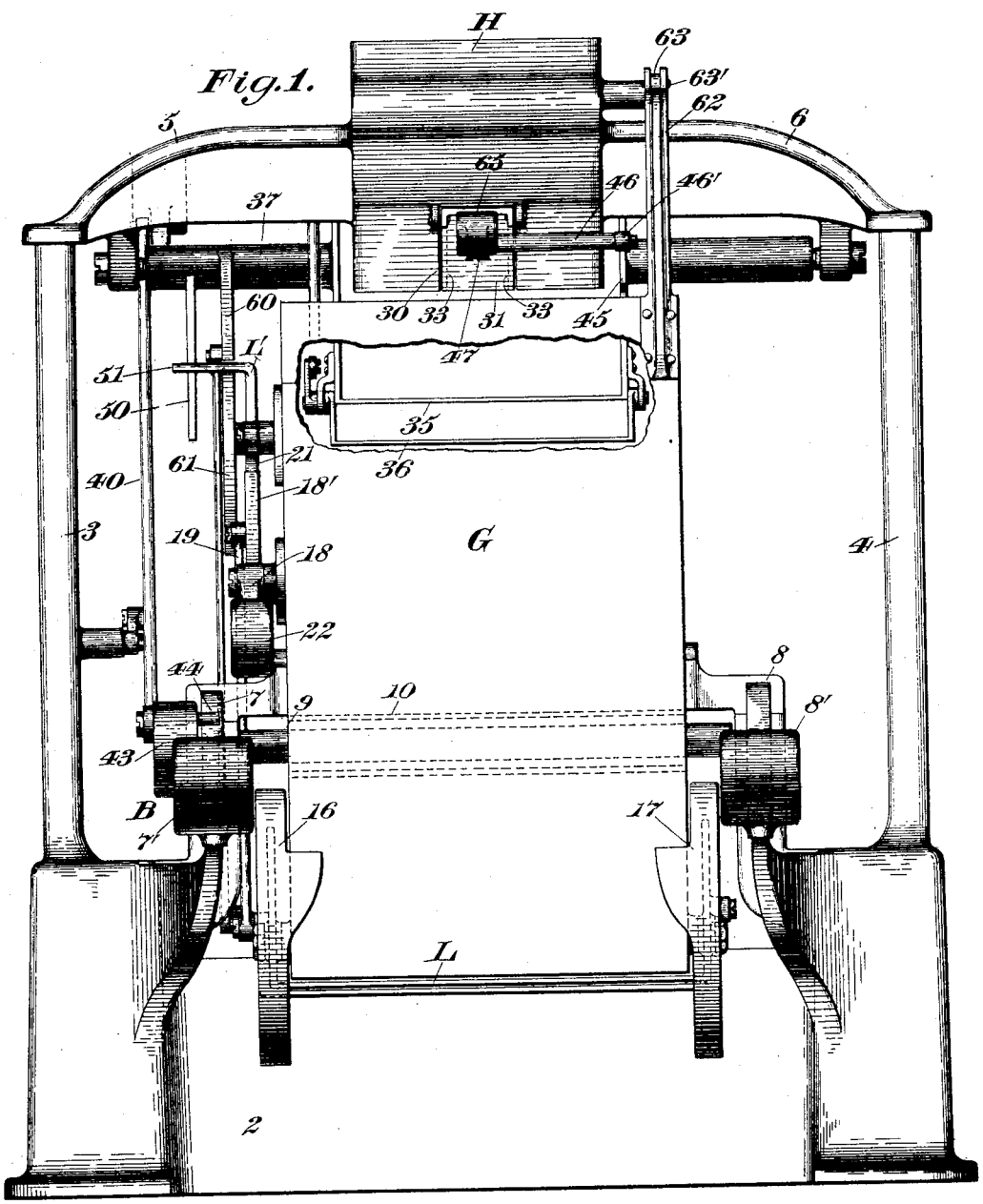
Figure 2:
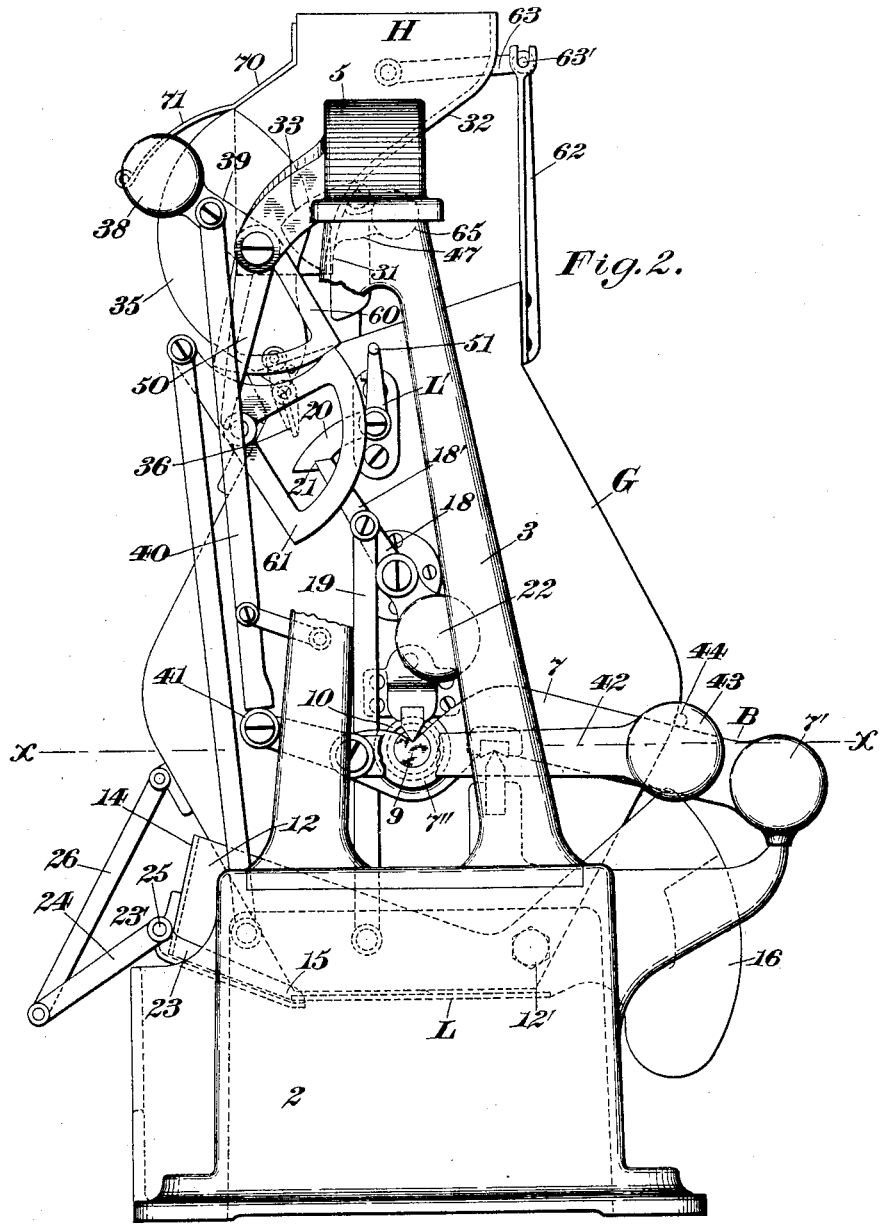
Figure 3:
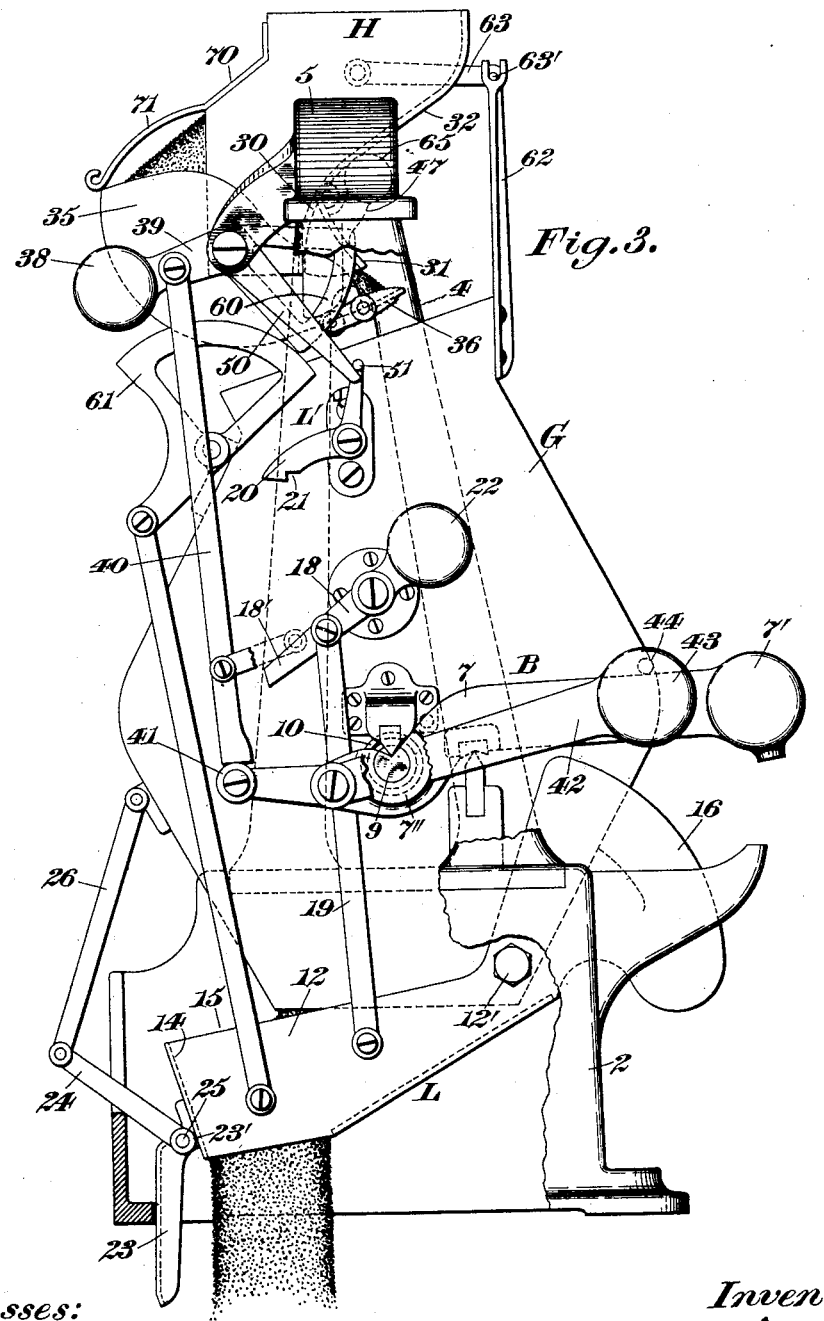
Figure 4:
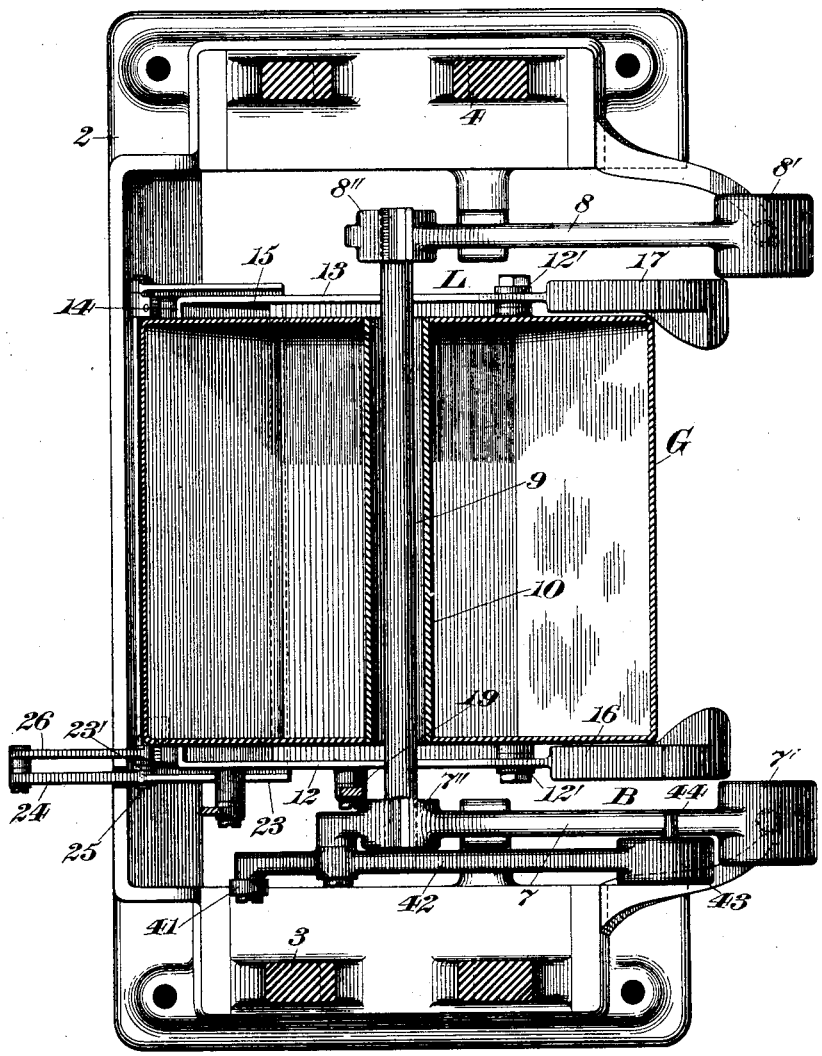

In the drawings accompanying and forming part of this specification, Figure 1 is a rear elevation of a weighing-machine embodying my present invention. Figs. 2 and 3 are end elevations of the machine as seen from the left in Fig. 1, showing the same at the commencement and close, respectively, of the weighing operation. Fig. 4 is a transverse section taken in line $xx$, Fig. 2; and Figs. 5, 6, and 7 are longitudinal central sections of the stream supplying and controller mechanism and a portion of the load-receiver, the stream-controller or valves being shown in three successive positions.

Similar characters designate like parts in all the figures of the drawings.

The framework for sustaining the various sets of mechanisms and parts may be of any suitable structure, it being represented herein consisting of the substantially U-shaped base or bed 2, the end frames or columns 3 and 4, which are set thereon, and the brackets 5 and 6, which extend oppositely from the supply-hopper H, said parts being secured together in some ordinary manner.

The supply hopper or chute H constitutes a convenient means for delivering a stream of material to the load-receiver of the weighing mechanism to build up the load therein.

The weighing mechanism comprises a load-receiver, as G, and a scale-beam, as B, for supporting the same.

The scale-beam in the present case consists of two members or longitudinal arms, as 7 and 8, pivotally supported in the usual manner upon the framework and connected together for simultaneous movement, the connection between said beam members passing through the load-receiver. The two sections 7 and 8 of the scale-beam, are furnished with the counterweights 7' and 8', respectively, which are of a mass equaling that of the load-receiver and its predetermined charge. The connection between the two members of the scale-beam is represented herein as a longitudinal shaft 9, which is suitably secured within hubs formed at the inner ends of the two beam members. The longitudinal shaft passes through the elongated tube or cylinder 10, disposed transversely of the load-receiver and suitably fixed thereto. The load-receiver at each of its ends is preferably furnished with depending knife-edges, or similar journals, which work in notches formed in the hubs 7" and 8", respectively, of the two beam members.

The load-receiver G has the usual discharge-outlet, which is normally covered by a suitable closer, such as L, the latter consisting in the present case of a flat plate, which, when shut, as represented in Fig. 2, is adjacent to the lower edge of the load-receiver, said closer being also pivoted at 12' to said load-receiver at one side of its outlet.

The closer L has flanges at its opposite ends and along its front, or that part thereof farthest from its center of movement, said front flange being so situated as to form between the same and the discharge edge of the closer an opening. The end flanges of the closer (see Fig. 4) are designated by 12 and 13, respectively, and the front flange is designated by 14, and the space between said front flange and the discharge edge of the closer L is denoted by 15. It will be evident, therefore, that the closer L, in conjunction with the several flanges which partially surround the same, constitutes a hopper which is adapted to retain a comparatively large body of material on the opening of the closer, whereby the shutting of said closer will be sufficiently retarded or prolonged to assure the complete emptying of the load-receiver. The closer L has at its rear the counterweighted plates 16 and 17, which act as balance-weights for the closer and the parts thereon.

The closer-holding means includes as a part thereof a latch, as L', which is pivoted near the upper end of the load-receiver and is adapted to engage a suitable member connected with the closer, as the counterweighted lever 18. The lever 18 is pivoted upon the load-receiver G and has the rod or link 19 connected therewith, said rod being similarly attached to the end flange 12 of the closer. The lower arm 20 of the latch is provided with a notch 21, which is adapted to receive the coöperating arm 18' of the counterweighted lever 18, the latter constituting a convenient device for shutting the closer. On the tripping of the latch L' at the proper point in the operation of the machine the arm 20 thereof will be disengaged from the coöperating arm 18' of the lever 18, so that the mass in the load-receiver G can force the closer L open, the weight 22 of said lever being simultaneously elevated. On the opening of the closer the several end flanges thereof will retain a considerable quantity of material, sufficient to overbalance the weight 22 when in its highest position, to thereby maintain the closer in its wide-open position. When the mass from the load-receiver has passed forward of the discharge edge of the closer, it being understood that it flows through the opening 15, the weight 22 is free to drop, and in so doing will shut the closer L through the intermediate link or rod 19.

For the purpose of preventing the escape of material from the load-receiver during the loading period I prefer to cover the outlet 15 with a valve, such as 23, the latter being pivoted at 23' to the front flange 14 and having the crank-arm 24 connected with the projecting pivot 25 thereof, so that should material work through the space between the closer and the adjacent load-receiver said valve 23 will prevent its waste. The crank-arm 24 is pivoted to the link 26, which is likewise connected with the load-receiver, so that as the closer opens the valve 23 will be simultaneously opened to permit the material to pass freely through the outlet 15.

The supply-hopper H has a drip-opening, which is preferably formed in the front wall thereof and through which, at a predetermined point, the drip-stream is adapted to flow to complete the partial load or charge in the load-receiver G, said opening being normally closed or covered, however, by a drip-regulator, whereby the drip-stream cannot flow therethrough during the major part of the operation of the stream-controller to affect the advancing movement of the latter.

The drip-opening is designated by 30, and the drip-regulator is denoted by 31, the latter being normally in alinement with the adjacent portions of the front wall 32 of the hopper, as seen in Fig. 5. The drip-regulator 31 consists of a slightly-curved plate pivoted at its upper side to the hopper H and having end flanges or wings, as 33, which when said drip-regulator is swung to its extreme outward position, as represented in Figs. 6 and 7, are adapted to prevent lateral flow of the drip-stream.

The stream-controller in the present case consists of a pair of valves, one of which, or the main valve, being designated by 35, the auxiliary valve being designated by 36 and being pivotally supported upon the main valve in the manner shown in Letters Patent No. 548,850, granted to me October 29, 1895. The main valve 35 is pivotally supported between suitable arms on the brackets 5 and 6, respectively, said valve being carried by the two-part shaft 37.

As a means for advancing the stream-controller or valves 35 and 36 the weight 38 is represented, said weight being formed at the outer end of the arm 39 on the two-part rock-shaft 37 and normally exerting a valve-advancing or valve-closing action, which, however, is regulated by the weighing mechanism, as will now appear.

The arm 39 has pivoted thereto the rod 40, the free end of which bears against a projection or antifriction-roll 41 on the end of the shiftable auxiliary beam or valve-opening actuator 42, the latter being counterweighted, as at 43. The counterweight 43 is provided with a pin 44, which normally rests upon the beam member 7, whereby the roll end of the auxiliary beam 42 constitutes, in effect, a fixed extension of the beam-section 7, whereby and as the weighing mechanism descends during the passage of the supply-stream into the load-receiver the valve 35 cannot be closed too rapidly by the weight 38, as the auxiliary beam 42, against which the rod 40 bears, will prevent such action and will continue to do so until the supply-stream is completely cut off. The auxiliary beam 42 on its return stroke will, through the intermediate rod 40, force the valve 35 open.

As a means for actuating the drip-regulator 31, whereby it is made to uncover the drip-opening, I prefer to provide means operative with the stream-controller, such as the cam 45, fixed on one of the end walls of the main valve 35, said cam being coöperative with a lateral projection, as 46, which extends from the arm 47 on the face of the stream-regulator 31, said projection having at its outer end an antifriction-roll 46', which serves its well-known purpose and which is engaged by the cam 45. The cam 45 has the curved face 45', which is concentric with the axis of oscillation of the valve 35, so that the latter can advance for a short distance without affecting the position of the drip-regulator 31. When, however, the roll 46' comes in contact with the face of the convex portion or bulge 45' on the closure of the valve 35, the regulator 31 will be swung outward to uncover the drip-opening 30, as represented in Fig. 6, whereby the drip-stream can pass through the opening 30 and over the material banked up on the two valves 35 and 36. During the poising period the load-receiver will be descending slowly, so that the two valves will be farther advanced by the actuator or weight 38 as the latter drops, and during this stage of the operation the auxiliary or supplemental valve 36 will be shifted relatively to the main valve for cutting off the drip-stream. The means for thus shifting the auxiliary valve and the operation thereof are clearly shown in the Letters Patent hereinbefore referred to. Hence a further description thereof is deemed unnecessary herein.

As a means for shutting the drip-regulator 31 on the opening of the valves 35 and 36 suitable means will be employed, a weight, as 65, being represented herein for this purpose, said weight being shown formed at the outer end of the arm 47 and being adapted, as the valve 35 opens, to swing the regulator inward, whereby it will be caused to cover the drip-opening when the valve has nearly reached its wide-open position.

To trip the latch L' to effect the discharge of a load, I prefer to employ a device coöperative with the valve 35, such as the depending arm 50 on the two-part rock-shaft 37, said arm or latch-tripper being adapted to engage the projecting pin 51 of the latch L' on the completion of the load to thereby swing the lower curved arm 20 of the latch so that the latch is disengaged from the counterweighted closer-shutting lever 18.

The hopper or chute H at its rear has rigidly fastened thereto the guard-plate 70, the lower portion of which is curved, as at 71, the inside face of such curved portion being concentric with the axis of movement of the valve, and the rear of the valve is adapted to run substantially in contact with such portion as said valve opens and closes, whereby waste of the material is prevented.

A pair of reciprocally-effective interlocking stops are shown at 60 and 61 connected, respectively, with the valve 35 and the closer, each being adapted to block the action of the other in the manner set forth by Letters Patent No. 548,840, granted to me October 29, 1895, to which reference may be had.

An upright guide-bar is shown at 62 fixed to the upper end of the load-receiver and notched or bifurcated at its upper end for the reception of the oppositely-projecting pins 63' of the guide-link 63, which is pivoted to the hopper H or a lug thereon.

The operation of the hereinbefore-described machine, briefly stated, is as follows: Fig. 2 represents the closer L shut, or held in such position by the latch L', which is in engagement with the counterweighted lever 18, and the valve 35 wide open, as shown also in Fig. 5, so that a stream of large volume will pass from the hopper H and enter the load-receiver G. When a certain proportion of the load has been received by the load-receiver, it will descend, so that the auxiliary beam 42, moving away from the rod 40, will permit the closure of the valve 35 and the progressive reduction in volume of the supply-stream. When the valve 35 has reached a predetermined point in its closure, the cam 45 is adapted to swing the drip-regulator or plate 31 outward, as represented in Fig. 6, to permit the drip-stream to enter the load-receiver, the valve 35 continuing to close during the operation. At a subsequent point, or when the load is completed, the auxiliary valve will be shifted relatively to the main valve to cut off the drip-stream, as is clearly set forth in Letters Patent No. 548,850, hereinbefore mentioned. At about the time the drip-stream is cut off the tripper or arm 50 that oscillates with the valve 35 will engage the pin 51 of the closer-holding latch L' to trip said latch, as shown in Fig. 3, whereby the closer L will be released and can be forced open by the weight of the load within the load-receiver G. When the mass has passed below the discharge edge of the closer L, it will be released and shut by the dropping of the counterweight 22 and then latched by the latch L', subsequent to which the other parts of the machine will resume their initial positions.

Having described my invention, I claim—

1. The combination, with a hopper having a drip-opening or notch in its front wall, of a drip-regulator; a device adapted normally to hold said regulator in a position to cover the drip-opening or notch; a cut-off valve situated below the hopper; valve-closing mechanism; and means for causing the drip-regulator to uncover said opening at a predetermined point in the closure of the valve.

2. The combination, with a hopper having a drip-opening or notch in its front wall, of a cut-off valve for the hopper; a drip-regulator adapted normally to cover said drip-opening; and means operated by the valve for causing said drip-regulator to uncover said drip-opening.

3. The combination, with a hopper having a drip-opening or notch in a wall thereof, of a drip-regulator mounted on the hopper; means acting against said drip-regulator to cause it normally to cover said drip-opening; a cut-off valve; valve-closing mechanism; and means operated by said cut-off valve for actuating the drip-regulator to cause it to uncover the drip-opening.

4. The combination, with a hopper having a drip-opening in a wall thereof, of a cut-off valve for said hopper; means for holding the drip-regulator in a position normally to cover said drip-opening; and a cam on the cut-off valve, for operating the drip-regulator to cause the same to uncover the drip-opening.

5. The combination, with a hopper having a drip-opening in a wall thereof, of a cut-off valve for said hopper; an oscillatory drip-regulating plate supported on the hopper; means in position normally to cause the drip-regulator to cover said drip-opening; and means operated by the cut-off valve for causing the drip-regulator to uncover the drip-opening.

6. The combination, with a hopper having a drip-opening in a wall thereof, of a cut-off valve for said hopper; a drip-regulator pivotally supported on the hopper and having a lateral projection; and a cam on the cut-off valve, adapted to engage said projection.

7. The combination, with a load-receiver having a cylindrical tube transversely disposed therein, of a scale-beam consisting of two counterweighted members connected by a shaft at their poising or inner ends for simultaneous movement and disconnected at their counterweighted or opposite ends, said shaft passing through said tube.

8. The combination, with a load-receiver having a discharge-outlet; of a closer for said outlet, pivoted to the load-receiver and having flanges along its ends and front, said front flange being so situated as to form an opening between the same and the discharge edge of the closer.

9. The combination, with a load-receiver having a discharge-outlet; of a closer for said outlet, having flanges along its front and ends, said front flange being so situated as to form an opening between the same and the discharge edge of the closer; and a valve for said opening.

10. The combination, with a load-receiver having a discharge-outlet; of a closer for said outlet, pivoted to the load-receiver and having flanges along its ends and front, said front flange being so situated as to form an opening between the same and the discharge edge of the closer; and a valve for said opening, connected with the load-receiver.

11. The combination, with a load-receiver having a discharge-outlet; of a closer for said outlet, pivoted to the load-receiver and having flanges along its ends and front, the front flange being so situated as to form an opening between the same and the discharge edge of the closer; a valve for said opening, said valve having a crank-arm; and a link connected, respectively, with the load-receiver and crank-arm.

12. The combination, with a load-receiver having a discharge-outlet; of a closer for said outlet, pivoted to the load-receiver, said closer having flanges at its ends and front, the front flange being so situated as to form a space between the same and the discharge edge of the closer; a counterweighted lever mounted on the load-receiver and connected with the closer; and a latch adapted to engage said counterweighted lever.

FRANCIS H. RICHARDS.

Witnesses:
F. N. CHASE,
ANDREW FERGUSON.